April 4, 1950        D. DAVIDSON        2,503,031

SELF-CLOSING AUTOMOBILE GAS CAP

Filed Jan. 21, 1947

Inventor

Donald Davidson

By *Clarence A. O'Brien and Harvey B. Jacobson*

Attorneys

Patented Apr. 4, 1950

2,503,031

UNITED STATES PATENT OFFICE 2,503,031

SELF-CLOSING AUTOMOBILE GAS CAP

Donald Davidson, Franklin Square, N. Y.

Application January 21, 1947, Serial No. 723,267

1 Claim. (Cl. 220—35)

This invention relates to improvements in self-closing caps particularly those adapted to be used in conjunction with automobile and other vehicle fuel tanks.

An object of this invention is to provide a structurally improved fuel tank cap particularly intended for use with automotive vehicles.

Another object of this invention is to provide a cap which may be substituted for the conventional cap found in most automotive vehicles.

A further object of this invention is to provide means for resiliently biasing the door of said cap to its closed position.

A still further object of this invention is to provide an improved resilient means housing whereby the admittance of fuel is not materially impeded.

Another object of this invention is to provide an inexpensive, durable and dependable device of the character described.

Other objects and features of novelty shall become apparent in following the description of the illustrated preferred embodiment of the inventive concept illustrated in the accompanying drawings, wherein.

Referring now in detail to the illustrated preferred embodiment of the instant invention, like reference characters are used to indicate similar parts throughout.

Figure 1:
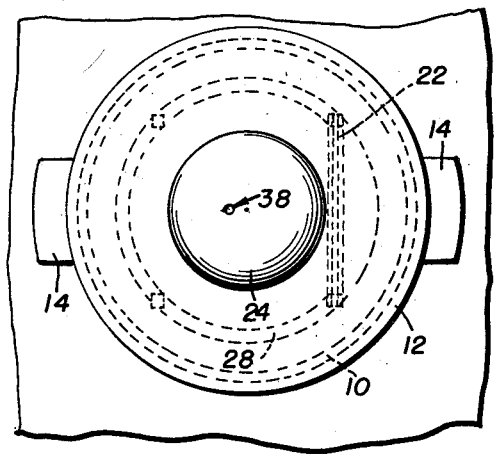
Figure 1 is a plan view of the instant invention showing the same secured to an automobile fuel inlet conduit.
Figure 2:
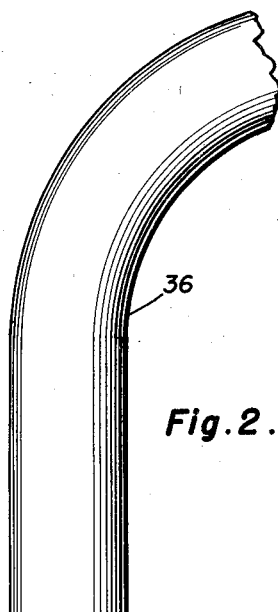
Figure 2 is a side sectional view of the instant invention showing a fuel inlet nozzle used therewith.
Figure 3:
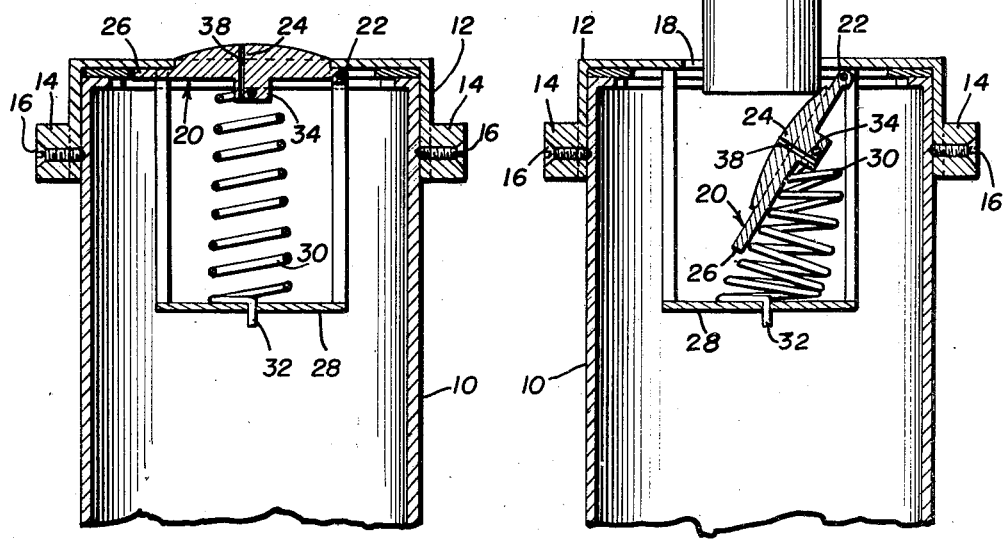
Figure 3 is a side sectional view similar to that shown in Figure 2 with the fuel inlet nozzle removed.

Frequently the cap of the fuel storage system is lost or misplaced in filling the fuel storage tank. It is also not infrequent that a conventional fuel tank cap is lost while the associated vehicle is in transit. This invention has been developed and refined to combat these difficulties and to provide an efficient easily operated fuel tank cover.

Adjacent the end of a fuel tank conduit 10 is an annular housing 12 having protuberances 14 secured to or formed integral therewith. Suitable securing means such as the bolts 16 are provided through said housing 12 and protuberances 14 and are adapted to frictionally engage said conduit 10.

An aperture 18 is provided centrally of said housing and door 20 is pivotally mounted thereunder. Any suitable pivot means may be used, however, the preferred construction is a simple pivot pin 22 extending through appropriate apertures in the housing and through a slot in the said door 20. A raised portion 24 is provided on one face of the said door 20 and is adapted to be received within the said aperture 18. An annular portion 26 of the said door 20 is adapted to engage the inner surface of the said annular housing 12 adjacent the aperture 18. A substantially liquid retaining seal is effected by this construction.

A U-shaped member 28 is secured within the said housing 12 and has received thereon a resiliently biasing means 30, preferably a simple coil spring. One end of the said spring 30 is anchored at 32 to the web of the said U-shaped member and the other end of the said spring is pivotally received in a depending flange 34 which is secured to the said door 20.

In operation a fuel nozzle 36 is simply pressed on the raised portion 24 in order to open the door 20. Fuel may then be squirted into the conduit 10 thence to the fuel storage tank. When the desired amount of fuel has been delivered, the nozzle 36 is simply removed and the spring biasing means 30 returns the door to its closed position. In order to relieve the vacuum conventionally present above the fuel in a fuel tank, an aperture 38 is provided through the door 20.

Due to the mechanical simplicity of this invention a further description thereof is deemed unnecessary and it is understood that variations as to size and shapes may be made herein without departing from the spirit of the invention. Accordingly, limitation is desired only in accordance with the scope of the following claim.

Having thus described this invention what is claimed as new and novel is:

In a self-closing closure for use with a fuel tank conduit, an annular housing, flanges attached to said housing and means associated with said flanges for securing said housing to a fuel tank conduit, said housing having a central aperture, a door pivotally mounted on said housing, said door having an annular extension larger than said aperture engaging the under surface thereof, a raised portion on said cap substantially the same size as said aperture and adapted to extend therethrough, means for resiliently biasing said door to the aperture closing position, said means including a U-shaped member secured to said housing, a spring in said member secured to the web of said member at one end thereof and secured to said door at the other end thereof, said raised portion being smoothly curved to form a cam.

DONALD DAVIDSON.

REFERENCES CITED

The following references are of record in the file of this patent:

UNITED STATES PATENTS

| Number | Name | Date |
|---|---|---|
| 1,742,700 | Fisher | Jan. 7, 1930 |
| 1,810,019 | Jaworsky | June 16, 1931 |
| 1,818,608 | Chafkin | Aug. 11, 1931 |
| 2,037,499 | Collard | Apr. 14, 1936 |